United States Patent [19]

DeSanto, Jr. et al.

[11] Patent Number: 4,981,517
[45] Date of Patent: Jan. 1, 1991

[54] PRINTING INK EMULSION

[76] Inventors: Ronald F. DeSanto, Jr., 232 Carlisle Ave., Westmont, Ill. 60559; Sam S. Carava, 7 Pembroke La., Oakbrook, Ill. 60521; Harold B. Parkinson, Gardner, Ill. 60424

[21] Appl. No.: 365,355

[22] Filed: Jun. 12, 1989

[51] Int. Cl.$^5$ .............................................. C09D 11/06
[52] U.S. Cl. ........................................ 106/28; 106/30; 106/32; 106/253
[58] Field of Search ...................... 106/28, 30, 32, 253

[56] References Cited

U.S. PATENT DOCUMENTS

| | | | |
|---|---|---|---|
| 2,291,293 | 7/1942 | Curtis | 106/28 |
| 2,325,297 | 7/1943 | Barmeier | 106/32 |
| 2,436,791 | 3/1948 | Cray | 106/32 |
| 2,439,378 | 4/1948 | Berberich | 106/32 |
| 2,762,712 | 9/1956 | Bloch et al. | 106/28 |
| 3,847,623 | 11/1974 | Mills et al. | 106/32 |
| 4,045,232 | 8/1977 | Parkinson | 106/28 |

*Primary Examiner*—William R. Dixon, Jr.
*Assistant Examiner*—Helene Klemanski
*Attorney, Agent, or Firm*—R. A. Blackstone, Jr.

[57] ABSTRACT

A printing ink emulsion system containing an oil-base phase and water-miscible phase and exhibiting a high degree of stability against phase separation in use. The composition contains a small amount of phosphoric acid as a stabilizer, and is characterized in that the printing emulsion functions effectively as a single-application-step formulation in which the ink is retained only by the image portion of a plate, thus obviating the need for a separate operational step in which water is applied to a non-image area of a printing plate or roller to render that area ink-repellant.

5 Claims, No Drawings

PRINTING INK EMULSION

FIELD OF THE INVENTION, AND BACKGROUND

The present invention relates to a printing ink composition. More particularly, the invention is directed to a printing ink emulsion for lithographic and related printing and in which the composition is used effectively in a single-application-step printing process obviating and requirement for a separate water coat application to a non-image area of a printing plate to render that area ink-repellant.

The present invention constitutes an important improvement in both ink compositions and in the manner in which such compositions are applied in lithographic printing and in related printing such as offset printing, lithography, ect.

The art in which the present finds utility is a highly sophisticated and highly developed art in which the printing surface involved is of the type that is devoid of appreciable elevation variation, relief, or depression. This type of printing may be contrasted generally with what is known as letter press printing in which raised type or image surfaces are involved.

The general construction and composition of printing plates of the type useful in practicing the present invention are well-known in the art. Accordingly, no detailed description is deemed to be required herein. A description of lithographic printing, including a summary of the various techniques involved is found in Parkinson U.S. Pat. No. 4,045,232, and the entire disclosure of that patent is hereby specifically incorporated herein by reference, to the extent it is not inconsistent herewith.

The various methods which have been employed to apply an image to be imprinted onto the surface of the plate are described in the cited reference, which also includes a description of the preparation of the plates themselves. The method by which the printing plate is prepared for use does not constitute an element of the present invention. Rather, the invention lines in the provision of a unique printing ink composition of the type which may be used without the need to apply a water coating to the surface of the printing plate to define a non-image area which is thus rendered ink-repellant.

Various techniques and compositions have been suggested for use in lithographic type printing techniques so as to obviate the need to apply a water coating to the surface of the printing plate. Among liquid preparations which have been proposed as treating media to be applied to non-image areas of printing plates are solutions containing particular salts and glycerin. Such solutions have been found objectionable for various reasons including instability in use and as being objectionably hygroscopic. Moreover, it was necessary that the application of the solutions be frequently repeated, preferably with each successive inking of the printing plate or roll.

The desirability of being able to use an ink composition containing agents for treating both the image producing area and the non-print area, simultaneously, and from a single solution, has also been recognized. For the most part, compositions purporting to function in this manner have been found to be objectionable due to the lack of satisfactory definition and because of impaired toning. Such compositions have also failed to demonstrate the type of stability and reliability required for practical commercial use. It is, therefore, a principal aim of the present invention to proved a "single composition" printing ink for a "single application" which is effective to obviate the need for a separate water coating step in a lithographic type printing operation, and in which the composition obviates the deficiencies and shortcomings of prior art preparations and techniques.

SUMMARY OF THE INVENTION

The present invention constitutes a printing ink emulsion for use in lithographic-type printing operation. The emulsion exhibits a high degree of stability against phase separation in use and is effective as a single-application formulation for treating printing plates so that the image producing portion of the plate is effectively coated at the same time that the non-print or non-image area of the plate is rendered ink repellant.

It is an important feature of the composition of the ink emulsion that it includes a relatively small concentration of phosphoric acid as a critical component thereof.

A related feature of the invention is that the emulsion contains a diluent having the properties possessed by No. 1 and No. 2 fuel oil, the fuel oil functioning as a diluent and emulsion stabilizing agent.

A feature of the ink emulsion of the invention is the inclusion, in combination, of polyols and phosphoric acid, the latter being incorporated in a relatively small concentration and believed significant as an agent for enhancing the emulsification of the polyol constituents.

An important advantage of the single-composition, single-application-system ink emulsion of the invention is that it enables an operator readily to shift the operation to selected colors and obviates the need of balancing the ratio of water and ink phases in the treatment of the printing rollers or plates.

A related advantage of the emulsion printing ink composition of the invention and the method of its use is that the likelihood of human error is minimized, constancy of operation and quality is enhanced and significant saving in paper its achieved.

An important advantage realized through the use of the single-composition emulsion ink of the invention is a savings in paper and in paper cost. The present invention provides improved color balance from start to stop of each printed run. Less paper is thrown away prior to meeting the established color or density standards. Additionally, less paper is wasted during start up, the need for balancing of the separate water and oil phases being obviated. In accordance with the invention, the requisite "balance" is present initially (from start up), and is maintained.

Yet another important practical advantage achieved through the use of the single-composition, emulsion ink of the invention is that significant savings in roller expense is realized. Repair costs of rollers are reduced as is the cost associated with sleeving of the rollers.

A related advantage achieved through the present invention is the elimination of the need for a water-form roller system.

A feature of the emulsion, single-composition ink system of the invention is that the composition acts effectively as a leveling agent when used with other ink preparations, to prevent build-up, and serves also to prevent "toning" or filling in of plate components in unwanted areas.

It is a feature of the emulsion, single-composition ink system of the invention that it may be effectively used as well on offset presses, with letter presses and offset plates, and in offset printing.

It is a feature of the present invention that an inorganic acid is used as a component of the modified ink varnish of the ink emulsion, and it is a critical feature of the invention that the inorganic acid is phosphoric acid rather than nitric acid or sulfuric and rather than a mixture of nitric acid and sulfuric acid.

An advantage of the unique ink emulstion composition of the invention is that the shelf life of the product is greatly enchanced as compared with other off-set type printing systems.

Yet another advantage is that the need for chemical "driers" is obviated.

A related feature of the emulsion ink of the invention is that the product provides improved "drying" properties and characteristics, "excess" water being avoided.

It is an important advantage of the present invention that there is provided, as a diluent which also serves as an emulsion-promoting and stabilizing factor in the printing ink emulsion of the invention, a hydrocarbon solvent, being a petroleum fraction preferably of a nature typified by No. 1 fuel oil, No. 2 fuel oil and mixtures thereof.

Yet another important feature of the single-formulation printing ink emulsion of the invention is that it includes from about 10% to 21% by weight of added water.

A related advantage of the invention is the incorporation of fuel oil into the emulsion system, the fuel oil component serving to adjust the tack, improve the emulsion stability, and to enhance the roller transferability of the printing ink emulsion.

An important feature of the unitary lithographic ink emulsion of the invention is the incorporation of the combination of polyols and water which serve to extend the surface area of the water phase, to minimize evaporation, and to increase the longevity of the printing composition in use and in storage.

An important feature of the monolithographic varnish component of the printing ink emulsion of the invention, and which contains a mixture of varnish resins in combination with phosphoric acid and ethylene glycol, is that the varnish serves to lubricate the ink rollers, to prevent build-up on the balnket and on the printing plate, and acts additionally to maintain a proper water balance in the emulsion system.

Other and further objects, features and advantages of the invention will become apparent from a reading of the following specifications.

DETAILED DESCRIPTION OF THE PREFERRED EMBODIMENT

The aims and objects of the present invention are achieved by provding, as a single composition printing ink for use in lithographic and related printing methods, a stablized emulsion containing an aqueous phase and a non-aqueous phase, and emulsion stabilizing agents. The printing ink composition of the invention is produced by first combining a mixture of ink varnish compositions with phosphoric acid and a polyol, and incorporating a color-imparting agent to provide an ink varnish resinous phase or ink vehicle. To the ink vehicle there is then added an aqueous solution containing polyols and water to form an emulsion. Fuel oil is then intimately blended into the emulstion as a diluent and stablizer to form a single-application-step composition which may be used to define both image producing areas and non-image areas on the printing plate, and eliminating any need for separate phase application steps in a lithographic type printing process.

In the paragraphs below the preparation of each of the several systems and the method by which they are combined to provide the stabilized emulsion printing ink of the ink are described. Also provided are a series of examples which will serve to illustrate the invention and which are not to be interpreted in any limiting sense, since, based upon the teachings of the present invention those skilled in the art will be able to make variations and modifications without departing from the scope of the invention contribution. All such variations are deemed to be embraced by the claims appended hereto.

Preparation of Modified Ink Varnish

A modified ink varnish, for use as a component in the emulsion printing ink of the invention, was prepared as follows, using the designated ingredients in the following preferred concentrations and concentrational ranges.

12-25 parts by weight, and preferably eighteen parts by weight of an ink varnish including oleoresin, modified hydrocarbon resins and ester resins, 12-25 parts by weight and preferably eighteen parts by weights of additional ink varnishes containing phenol modified rosin and hydrocarbon resins, 0.5-5 and preferably 2.2 parts by weight of boiled linseed oil, up to about two parts by weight of phosphoric acid and preferably 0.7 part by weight were combined in a mixing vessel to provide component "A". 50-75 parts by weight and preferably sixty-two parts by weight, of ethylene glycol were weighed into a separate vessel, as part "B".

The contents of the first vat (part "A") were subjected to high speed mixing using a high speed shearing blade or a bow tie mixer to disperse the ingredients while the temperature of the mixture was maintained in the range of 105° F. to 150° F. While maintaining the mixing, part "B" was added at a rate of about 1% to 2% per minute to extablish a modified ink varnish. The varnish was mixed for about 15-20 minutes after completion of the addition of the part "B" component to ensure a uniform dispersion.

The tabular representation of the components of the modified varnish, and their concentration ranges, is set forth in the following Table I.

TABLE I

| MODIFIED VARNISH (BR100) | | |
|---|---|---|
| Component | Concentration (Parts by Weight) | Concentrational Range (Parts by Weight) |
| Oleoresin | | |
| Modified Hydrocarbon Resin | 18 | 12-25 |
| Ester Resin | | |
| Phenol Modified Rosin | 18 | 12-25 |
| Hydrocarbon Resins ("Gloss Enhancer") | | |
| Boiled Linseed Oil | 2.2 | 0.5-5 |
| Phosphoric Acid | 0.7 up | up to 2 |
| Ethylene Glycol | 62 | 50-75 |

An emulsification mix for incorporation with the modified varnish (BR100) of the invention was prepared by combining glycerin, ethylene glycol and water in the ratios designated in the following Table II.

TABLE II

EMULSIFICATION MIX (BR101)

| | (Parts by Weight) | Range (Parts by Weight) |
|---|---|---|
| Glycerin | 25 | 0–50* |
| Ethylene glycol | 25 | 0–50* |
| Water | 50 | 0–90* |

*The concentrations shall not be zero, simultaneously.

Forulation of Emulsion Printing Ink (Single-Ink System)

In preparing the emulsion printing ink of the invention, the designated components were combined in the manner indicated below:

15–50 parts by weight and preferably 19 parts by weight of the BR100, resin composition for modified varnish (Table 1) were combined with 15–50 parts by weight and preferably 18 by weight of a first ink varnish containing oleoresins, modified hydrocarbon resins and ester resins and 8–15 parts by weight and preferably 11 parts by weight of a second ink varnish composition containing phenol modified rosin and hydrocarbon resins, the resulting mixture being preferably at a temperature in the range of about 105° F. to about 115° F. 10–40 parts by weight and preferably about 14 parts by weight of a coloring agent, dye or pigment were added to the heated resinous mixture, with stirrring to provide a modified varnish base constituting an ink vehicle of the invention.

While agitating the ink vehicle while at a temperature of preferably 115° F., up to 40 parts by weight and preferably about 35 parts by weight of the BR101 emulsification mix was added to the modified ink varnish base with agitation to form an emulsion. While continuing to maintain the temperature and the agitation, about 0.5 to 7 parts by weight and preferably about 3 parts by weight of No. 1 or No. 2 fuel oil was slowly added to the agitated emlsion as a stablizing agent and to contribute to ensuring the desired degree of tack. The latter is preferably in the range of 1 at 1200/90°/1 to 10 at 1200/90°/1, as read on a Thwing Albert inkometer. Different values will be found under different conditions of r.p.m., temperature and time.

A designation of the components in the emulsioning formulation, including the concentrational ranges of each, is set forth in Table III, and additional specific examples of the single-ink system, emulsion ink of the invention are set forth in Table IV.

TABLE III

SINGLE INK SYSTEM EMULSION INK FORMULATION

| | Concentration (Parts By Weight) | Concentrational Ranges Parts by Weight |
|---|---|---|
| BR100, Modified Resin Comp. | 19 | 15–50 |
| Ink Varnish #1 | 18 | 15–50 |
| Ink Varnish #2 | 11 | 8–15 |
| Coloring Agent | 14* | 10–40* |
| BR101 (Emulsification Mix) | 35 | 25–40 |
| Fuel Oil | 3 | 0.5–7 |

*The amount of coloring agent used will depend upon and vary as a function of the strenth of the pigment and the intensity of color required in the final product.

TABLE IV

LITHOGRAPHIC, SINGLE INK SYSTEM, EMULSION INK
(Concentration in Parts by Weight)

| Examples | 1 | 2 | 3 | 4 | 5* |
|---|---|---|---|---|---|
| COMPONENTS | | | | | |
| BR100 (Monolithographic Varnish) | 18 | 17 | 18 | 20 | |
| Ink Vehicle Resins (including ester resins, hydrocarbon resins) | 17 | 17 | 18 | 16 | 17 |
| Body Gum (Phenol modified rosin, hydrocarbon resin) | 10 | 14 | 9 | 8 | 17 |
| BR101 (Emulsification mix, polyols and water) | 35 | 34 | 35 | 34 | |
| Emulsion Stabilizer (No. 1 or No. 2 fuel oil) | 3 | 4 | 5 | 6 | |
| HB5421 Pigment | 13 | | | | |
| Alk. Blue | 0.5 | | | | |
| Color | Black | Yellow | Red | Blue | |
| Yellow | | 12 | | | |
| H.S. Flush | | | | | |
| Red Flush | | | 13 | | |
| Blue Flush | | | | 13 | |
| Boiled Linseed Oil | | | | | 2 |
| Ethylene Glycol | | | | | 61 |
| Phosphoric Acid | | | | | 0.7 |

*BR100 monolithographic varnish

What is claimed is:

1. In a printing ink composition functioning effectively in a single-formulation, single-application-step printing process and obviating a need for applying successive coatings, including obviating a need for a separate water coat to be applied to a non-image portion of a printing plate,
    said composition comprising an emulsion and including an ink varnish resin dispersed in an oil-compatible phase of said composition,
    color-imparting means coloring said ink composition and selected from the group consisting of dyes, inorganic pigments, organic pigments and mixtures thereof,
    a polyol,
    water,
    a non-aqueous diluent, and
    an inorganic acid,
    the improvement wherein said diluent comprises emulsion-promoting and stabilizing means including a petroleum fraction,
    said emulsion-promoting and stablilizing means being present in said composition in a concentration in a range of from about 0.5% to about 7% by weight of said ink composition,
    wherein said inorganic acid is phosphoric acid present in said composition in a concentration of less than about 2% by weight of said ink composition, and
    wherein said water is present in a concentration of up to about 21% by weight of said ink composition.

2. The improvement as set forth in claim 1 wherein said petroleum fraction is characterized in that it exhibits physical and chemical properties corresponding to properties possessed by No. 1 and No. 2 fuel oil.

3. The method of preparing a monolithographic ink exhibiting minimized solvent evaportion and possessing high mechanical stability for use in a printing process, said process being operable as a single-formation, single-application-step in which the use of a separate water coat applied to a non-print area is obviated, said method comprising the steps of:
charging a mixing vessel with an oil-base ink varnish formulation including a resin selected from the group consisting of oleoresins, modified hydrocarbon resins, ester resins, boiled linseed oil, and mixtures thereof, and with phosphoric acid, and a glygol to provide an ink vehnicle, dispering a color-imprinting agent together with an additional ink varnish throughout the varnish formulation to provide an ink, blending a hydrocarbon into the ink while agitating, to establish an ink emulsion of controlled stability.

4. The method of preparing a composite composition lithographic printing ink formulation useful in carrying out, as a single-application-step, the coating of a printing plate to define image-producing areas and non-image areas on the printing plate, and eliminating a need for a separate water phase application step, said method including the steps of:

preparing a homogeneous mixture of ink varnish resins including boiled linseed oil and adding phosphoric acid and ethylene glycol thereto, combining the resinous phase with additional varnish resin compositions and a color-imparting agent, to provide a modified varnish base constituting an ink vehicle, adding a hydrocarbon solvent to the ink vehicle with agitation to provide a stable ink emulsion.

5. A printing ink base functioning effectively in a single-formulation, single-application-step printing process and obviating a need for applying successive coatings, including obviating a need for a separate water coat to be applied to a non-image portion of a printing plate, said composition comprising an emulsion and including an ink varnish resin dispersed in an oil-compatible phase of said composition, a polyol,
water,
a non-aqueous diluent, and
an inorganic acid,
said diluent comprising emulsion-promoting and stabilizing means including a petroleum fraction, said emulsion and stabilizing means being present in said composition in a concentration in a range of from about 0.5% to about 7% by weight of said ink composition, and wherein said inorganic acid is phosphoric acid present in said composition in a concentration of less than about 2% by weight of said ink composition, and wherein said water is present in a concentration up to about 21% weight of said ink composition.

* * * * *